Sept. 8, 1942.  B. C. EBERHARD  2,295,457
VALVE
Filed March 23, 1940   2 Sheets-Sheet 1
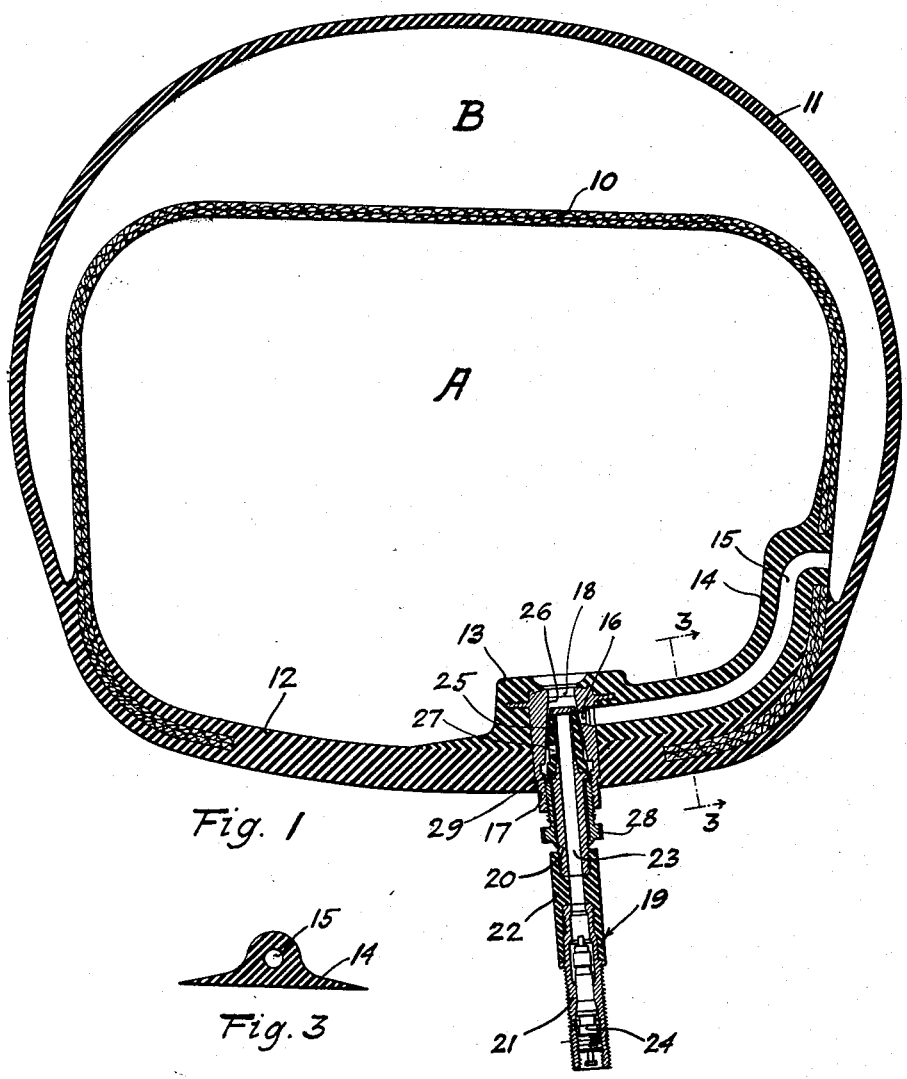
Fig. 1
Fig. 3
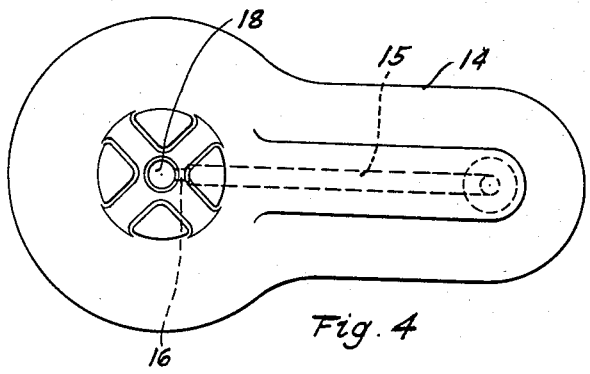
Fig. 4
Inventor
Boyd C. Eberhard
By
Attorney Sept. 8, 1942.   B. C. EBERHARD   2,295,457
VALVE
Filed March 23, 1940   2 Sheets-Sheet 2

Inventor
Boyd C. Eberhard
By
Attorney

Patented Sept. 8, 1942

2,295,457

UNITED STATES PATENT OFFICE 2,295,457

VALVE

Boyd C. Eberhard, Akron, Ohio, assignor to Wingfoot Corporation, Wilmington, Del., a corporation of Delaware Application March 23, 1940, Serial No. 325,649

4 Claims. (Cl. 251—43)

The present invention relates to plural-chambered safety tubes and particularly to the valves for inflating the same. One object of the invention is to provide a valve which is simple and durable and permits inflation of at least two tubes simultaneously.

Another object of the invention is to provide such a valve with means to cut off communication between chambers after inflation thereof or restrict the flow of air between chambers to such an extent that when one chamber fails, air can filter out of the other chamber but at a slow rate of speed, whereby the tire with which the tube is used will not go flat suddenly, thus permitting the driver to keep control of the vehicle to bring it to a safe stop.

Another object of this invention is to provide a valve having a relatively short base in which is threadedly mounted a hollow valve stem carrying a valve head adapted to cut off communication between at least two chambers of a multichambered tube after inflation, but which permits simultaneous inflation of said chambers and permits the flow of air from one chamber to the other until the pressure in both chambers is equalized.

A particular object of this invention is to provide the hollow valve stem heretofore mentioned with a flexible tubular part made preferably of rubber which, if destroyed, will not cause a deflation of any of the chambers of the tube. In short the hollow valve stem, if torn off, does not affect the sealing capacity of the valve head, all as more particularly set forth hereinafter.

Another object of this invention is to mount the valve head rotatably upon the hollow valve stem so that as the hollow valve stem is threaded into the base the stem may rotate while the valve head is non-rotatably pressed against its seat, whereby wear on the valve head is minimized.

Other objects of the invention will appear hereinafter as the description thereof proceeds, the novel features, arrangements and combinations being clearly set forth in the specification and in the claims thereunto appended.

In the drawings,

Fig. 1 is a transverse cross-section of a two-chambered tube equipped with a valve embodying the invention.

Fig. 3 is a cross-section through the lateral extension on the base of the valve taken substantially along the line 3—3 of Fig. 1.

Fig. 4 is a bottom plan view of the base of the valve.

Figure 2:
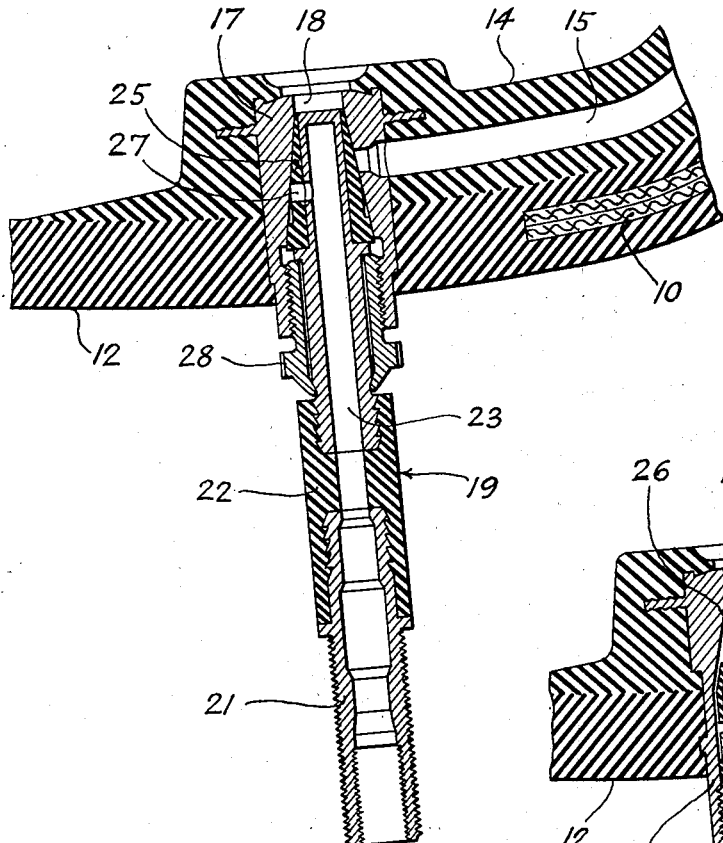
Fig. 2 is a similar fractional view showing the valve in a different position of adjustment.

Safety tubes embodying a plurality of chambers when employed on airplanes sometimes have one or more chambers fail while the airplane is taking off or landing. The pilot who is unaware of the failure, therefore experiences difficulty in landing or stopping the ship and may even have a serious accident. Since it is unlikely that all chambers will fail during a given flight, the present invention provides means to cut off communication between the chambers after inflation thereof, but provides means for simultaneously and quickly inflating all, or at least a plural number, of said chambers. Thus, the tube remains partly inflated upon failure of one of the chambers and aids the pilot in landing safely.

The invention is illustrated as applied to a tube of the character described in the Patent to Lee No. 2,173,065 in which there are two chambers, one within the other, both having a common wall at the base. The main difference, however, is that in this case the inner tube is imperforate instead of provided with a small port for slow leakage of air out of one chamber in case of failure of the other, and both tubes are simultaneously inflated through different ports.

The tube illustrated in Fig. 1 has an inner chamber A formed by the inextensible fabric wall 10 and an outer chamber B formed by the wall 10 and the outer rubber wall 11. Both tubes are joined at their bases to form a common wall 12.

The valve is provided with a rubber base portion 13 having a lateral extension 14, both of which are vulcanized to the inner side of the wall 10 as clearly illustrated in Fig. 1. The extension is provided with a longitudinal passage 15 which communicates with the outer chamber B and the port 16 in the hollow metal valve casing 17 embedded in the rubber base portion 13, whereby air supplied through the hollow valve stem will travel through the passage 15 into the outer chamber to inflate the same. Air enters the inner chamber through port 18 at the inner end of the valve casing 17.

A hollow valve stem generally designated by the reference character 19 is composed of three parts, a metal inner portion 20, a metal outer portion 21 and an intermediate portion 22 formed of flexible rubber or the like. This hollow valve stem has a hollow bore 23 extending therethrough so that air may be supplied to the chambers from an outside source of supply. A valve insert or check valve 24 in the metal portion 21 of the hollow valve stem prevents the back flow of air during and after inflation. The inner metal portoin 20 is provided with a valve, or valve head 25 having an outer conical surface adapted to seat on the conical valve seat 26 provided in the metal valve casing 17. The inner end of the valve 25 is imperforate and the valve is provided with a lateral opening 27 through which air supplied to the hollow valve stem may pass when the valve is open, as shown in Fig. 1. The air passing through the opening 27 goes around the valve 25 and enters chamber A through port 18 and chamber B through port 16 and passage 15.

A threaded nut 28 is threaded in the metal valve casing 17 and contacts a shoulder portion 29 on the metal portion 20 of the hollow valve stem to force the hollow valve stem inwardly to bring the valve 25 against its seat, thereby cutting off communication between said chambers and with the bore 23 of the hollow valve stem.

It will be noted from this construction that, even if the outer portion of the valve stem is torn off, as by rupturing the rubber portion 22 thereof, the sealing of the chambers is not affected and the air will be retained in both chambers or in that chamber which may be intact, as sometimes one or the other of the chambers fails as previously explained.

In Fig. 2 the valve is shown in its closed position and it will be noted that in this position no air can enter the port 18 or port 16.

Figure 5:
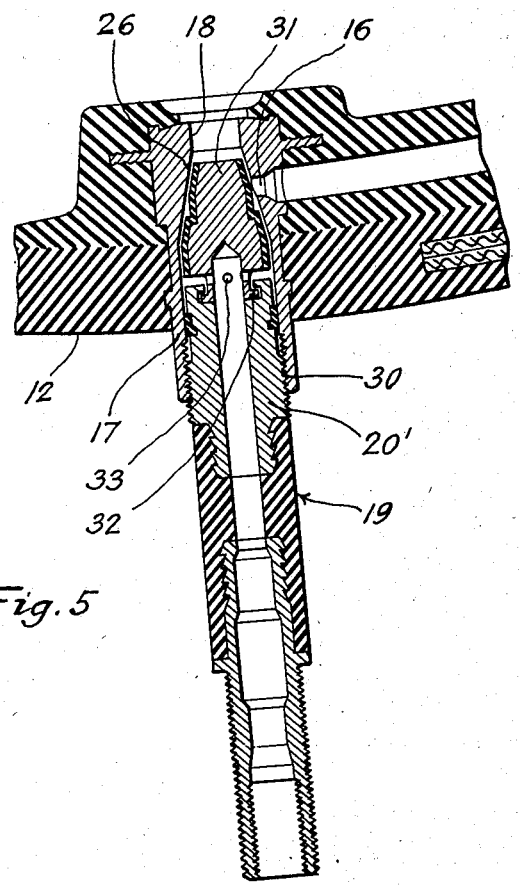
Fig. 5 is a view similar to Fig. 2 showing a modification of my invention.

In Fig. 5 I have illustrated a modified form of my invention and the same reference characters refer to similar parts shown in Figs. 1-4 inclusive. In this form of the invention, however, the hollow valve stem is slightly modified. Instead of having a nut 28 for advancing the hollow valve stem 19 inwardly, the portion 20', shown in Fig. 5, is threaded exteriorly, as at 30, into the metal valve casing 17. It is only necessary therefore to rotate the hollow valve stem itself to advance the stem inwardly to thereby bring the valve 31 against the seat 26. The valve 31 in this form of the invention has at its outer end a laterally extended flange 32 arranged within a recess in the inner end of the metal portion 20' of the stem and rotates therein, whereby the valve 31, when it engages its seat, need not rotate when the hollow valve stem 19 is rotated to advance the valve against its seat, thereby minimizing the wear on the valve.

Air could be supplied to the chambers through a lateral opening, such as 27 in Fig. 1, but it is preferred to provide the valve with the lateral openings 33 just adjacent the metal portion 20' of the stem, whereby, when the valve is open, air will pass around the valve into the port 18 and port 16 to inflate the chambers A and B respectively. The form of the invention shown in Fig. 5 operates substantially the same as the form of the invention shown in Figs. 1-4 inclusive, except that the valve 31 is rotatably mounted on the hollow valve stem for the purposes set forth. It also eliminates the nut 28 shown in Fig. 1, and, by so eliminating the nut, it is possible to have the metal portion 20 extend outwardly beyond the outer wall of the tube a lesser distance than is mechanically required in the construction shown in Fig. 1.

Sometimes when one chamber of a tube of this character fails and an attempt is made to land an airplane equipped therewith, the tube, due to the lessened amount of air within the tube, may be carried around on the rim, especially when the brakes of the airplane are applied, and a great many times when this happens the outer portion of the ordinary valve stem is caught within the valve stem opening in the rim and the valve stem is pulled off the tube, thus destroying the effectiveness of both chambers, with a consequent sudden deflation of the still intact chamber designed to carry the load.

With a valve made according to this invention, however, the inner metal portion 20 of the hollow valve stem on the metal valve casing 17 is relatively short, and if the entire hollow valve stem will not pull through the opening in the rim the rubber portion of the stem, if ruptured, will not cause a failure of the valve itself, as the valve, or valve head effectively seals the chambers from each other. The flexible portion on the hollow valve stem also permits easier withdrawal of the complete stem through the opening in the rim and prevents binding therein and so there is less likelihood of any portion of the hollow valve stem being destroyed.

It is obvious that various changes may be made in the particular arrangement and construction of the invention as disclosed in this application without departing from the spirit of this invention and therefore I do not wish to be limited except as hereinafter set forth in the claims.

Having thus fully described my invention, what I claim and desire to secure by Letters Patent of the United States is:

1. A valve assembly for use with plural-chambered safety tubes and the like and comprising a valve casing, an inwardly-tapering valve seat in the casing, said casing having a port communicating laterally with substantially the middle of the valve seat and an axially extending port opening to the bore at the smallest end of the valve seat, a valve stem having a hollow bore, said valve stem including an inner metal portion, an outer metal portion and a flexible rubber portion connecting the metal portions together, a conical valve rotatably carried by the inner metal portion and having port means opening into the bore of the stem, and cooperating threads formed on the outside of the inner metal portion and the inside of the valve casing whereby the valve can be moved axially of the valve seat to effect the sealing of the ports on the valve seat.

2. A valve assembly for use with plural-chambered safety tubes and the like and comprising a valve casing, an inwardly-tapering valve seat in the casing, said casing having a port communicating laterally with substantially the middle of the valve seat and an axially extending port opening to the bore at the smallest end of the valve seat, a valve stem having a hollow bore, said valve stem including an inner metal portion, an outer metal portion and a flexible rubber portion connecting the metal portions together, a conical valve rotatably carried by the inner metal portion and having port means opening into the bore of the stem, and means associated with the inner metal portion and the valve casing for moving the valve stem axially when the stem is rotated to move the valve into and out of engagement with the valve seat.

3. A valve assembly for use with plural-chambered safety tubes and comprising a valve casing, a substantially conical valve seat in the bore of the casing, said casing having a port communicating substantially laterally with the valve seat and an axially extending port opening to the bore at the smallest end of the valve seat, a valve stem having a hollow bore, said valve stem including an inner metal portion, an outer metal portion and a flexible rubber portion connecting the metal portions together, a conical valve rotatably carried by the inner metal portion and having port means opening into the bore of the stem, and means associated with the inner metal portion and the valve casing for moving the valve stem axially when the stem is rotated to move the valve into and out of engagement with the valve seat.

4. A valve assembly for use with plural-chambered safety tubes and comprising a valve casing, a substantially conical valve seat carried by the casing, a plurality of ports communicating with the valve seat, a valve stem having a hollow bore, said valve stem including an inner metal portion, an outer metal portion and a flexible rubber portion connecting the metal portions together, a conical valve rotatably carried by the inner metal portion and having port means opening into the bore of the stem, and means associated with the inner metal portion and the valve casing for moving the valve stem axially when the stem is rotated to move the valve into and out of engagement with the valve seat.

BOYD C. EBERHARD.